April 29, 1947.     C. BRUNO     2,419,817
WELDING MECHANISM
Filed Sept. 13, 1943     3 Sheets-Sheet 1
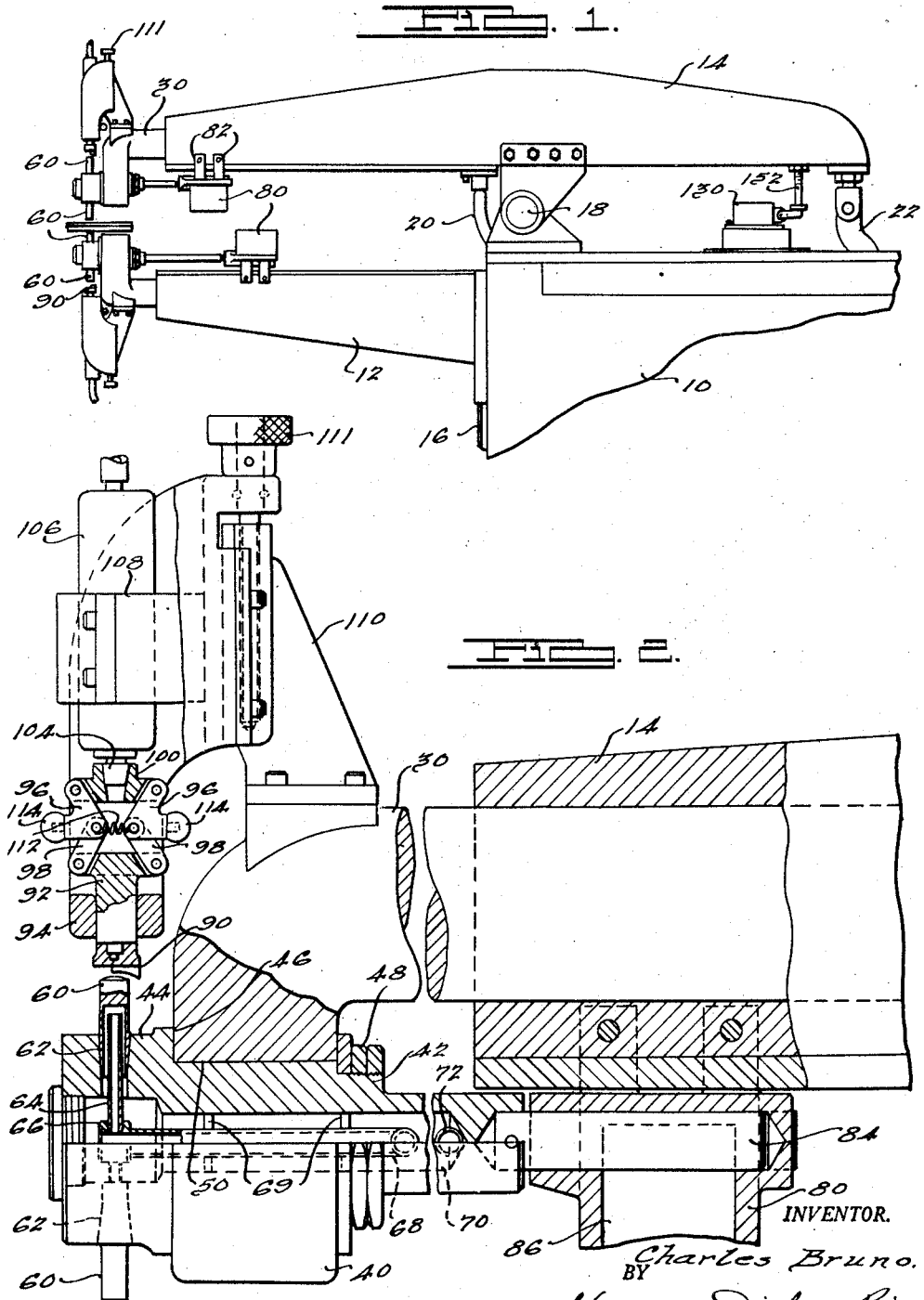

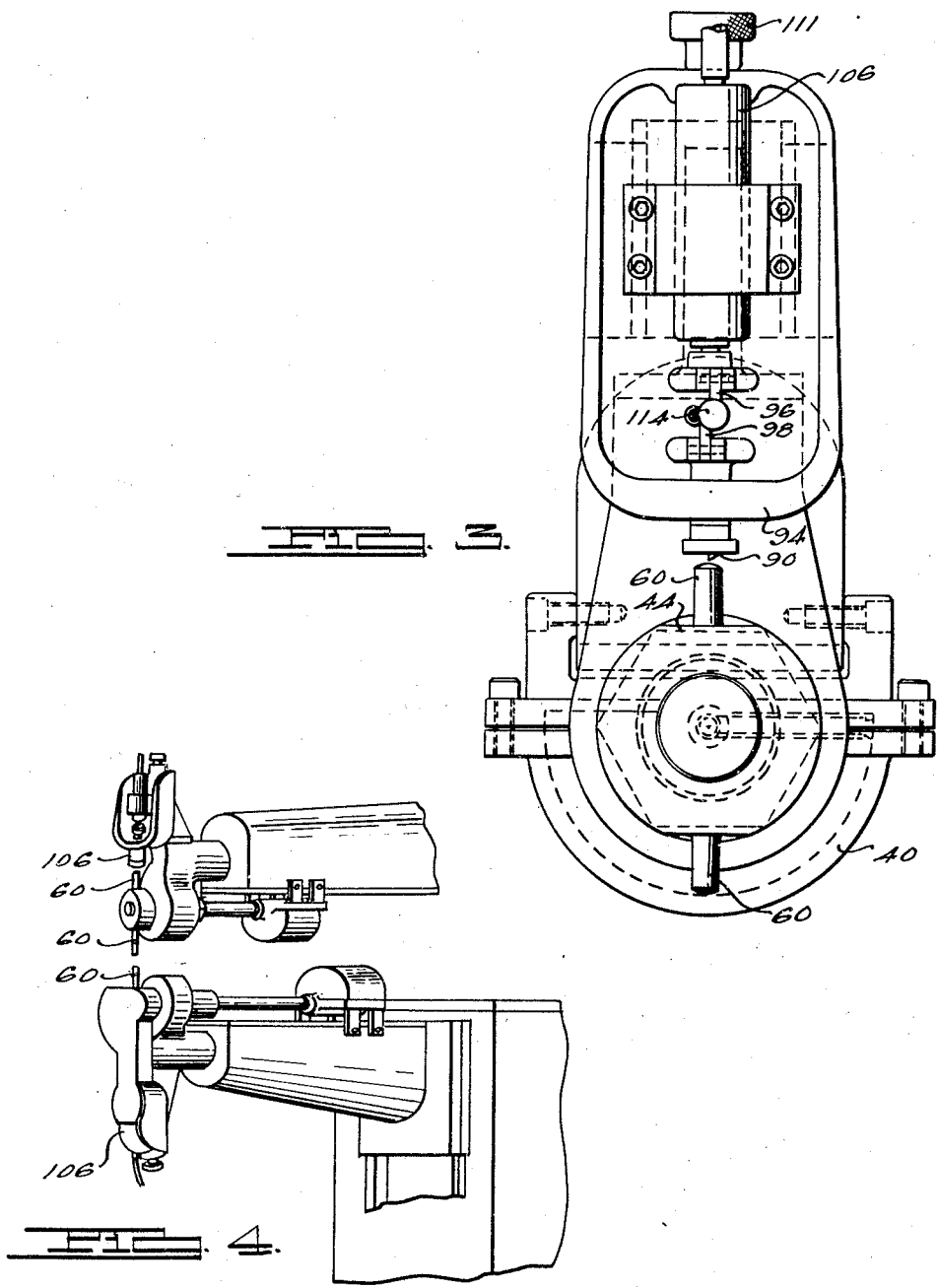

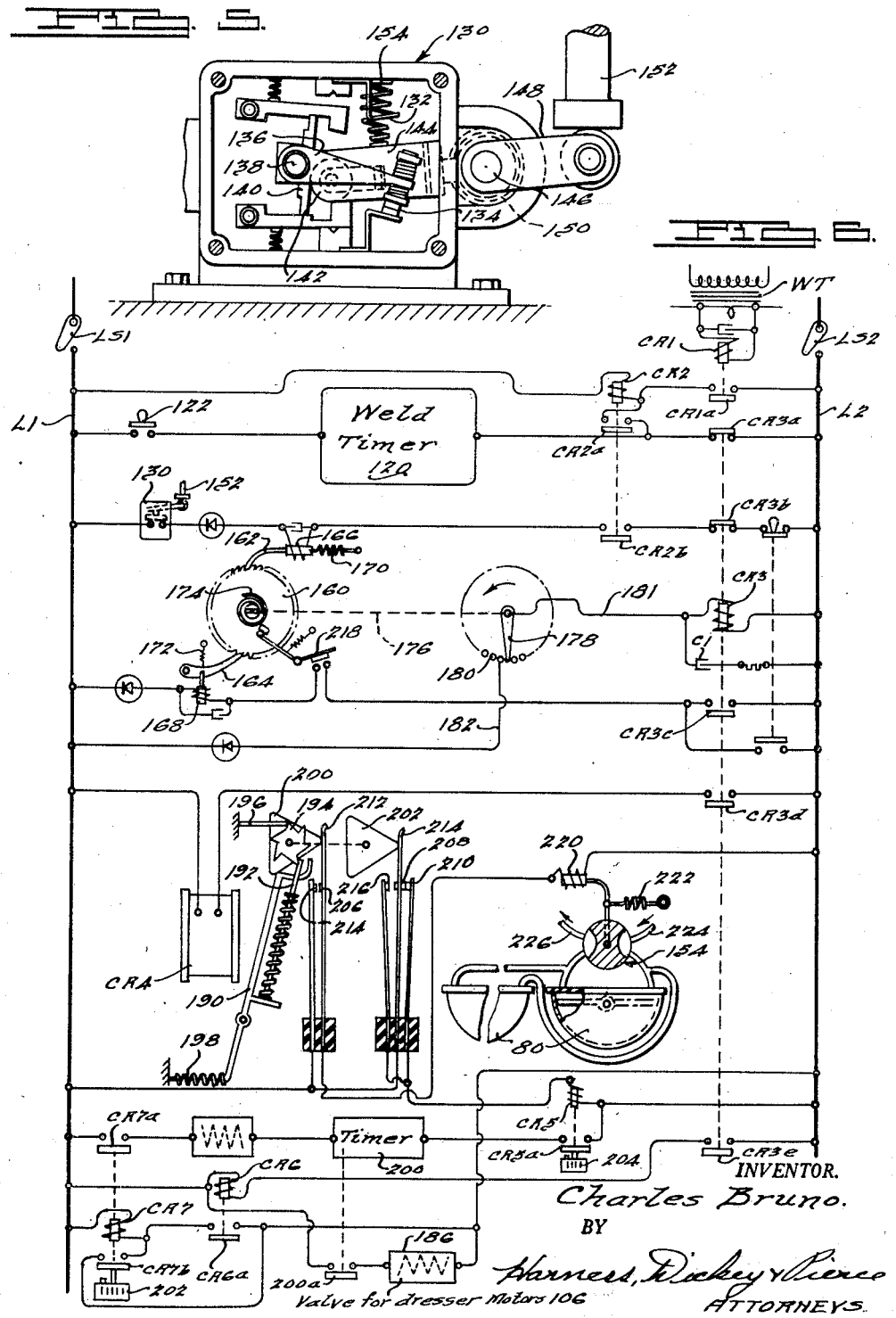

UNITED STATES PATENT OFFICE 2,419,817

WELDING MECHANISM

Charles Bruno, Highland Park, Mich.

Application September 13, 1943, Serial No. 502,085

5 Claims. (Cl. 219—4)

The present invention relates to welding mechanisms, and more particularly is directed to the provision of an improved method of dressing the electrodes of resistance welding machines and to the combination in such a machine of improved apparatus for effecting such dressing operations.

The principal objects of the present invention are to provide an improved method and apparatus as broadly characterized above, which is simple, economical and efficient; to provide such an arrangement utilizing means to support a plurality of electrodes for movement between welding and dressing positions, said means being effective in each of its several positions to support one electrode in welding position, and to support another electrode in a dressing position; to provide such an arrangement incorporating means at the dressing station to dress an electrode there positioned; to provide such an arrangement incorporating automatic means to control the movement of the electrode supporting means between its successive positions; and to generally improve and simplify welding operations of the above type.

With the above as well as other and more detailed objects in view, which appear in the following description and in the appended claims, a preferred but illustrative embodiment of the invention is shown in the accompanying drawings, throughout the several views of which corresponding reference characters are used to designate corresponding parts, and in which:

Figure 1 is a fragmentary view in side elevation of a resistance welding machine of the spot welding type, embodying the invention;

Fig. 2 is a fragmentary view, partly in section, of the structure associated with the upper horn of the machine of Fig. 1;

Fig. 3 is a view in front elevation of the structure of Fig. 2;

Fig. 4 is a fragmentary view in perspective corresponding generally to Fig. 1;

Fig. 5 is a more or less diagrammatic view of a limit switch which may be used in the practice of the invention; and Fig. 6 is a diagrammatic view of an automatic control system embodying the invention.

It will be appreciated from a complete understanding of the present invention that the improvements thereof may be embodied in or used in connection with various types of equipment. A preferred application of the invention is in connection with the familiar operation of dressing the electrodes of resistance welding machines of the spot welding type. In an illustrative but not in a limiting sense, the invention is so disclosed herein.

Referring to the drawings, the illustrated resistance welding machine is of the familiar rocker arm type, having a frame structure 10, which may house the usual welding transformer and certain other operating parts, a lower horn 12 and an upper horn 14. The lower horn 12 is secured to a face plate 16 provided at the front of the frame 10, and as will be understood, is electrically connected through this face plate to one terminal of the secondary winding of the welding transformer. The upper horn 14, also formed of conductive material, is pivotally supported by the frame 10 by means of a shaft 18. A flexible lead 20 may serve to connect horn 14 to the other terminal of the secondary winding of the welding transformer, it being understood that conventional means are utilized to properly insulate the horns 12 and 14 from each other and, where necessary, from other parts of the machine. Suitable and conventional operating mechanisms, such as rams (not shown) may be embodied in the frame structure 10, and may be coupled to the horn 14, through the link 22, for operating the horn 14. The horn 14 is shown in the position in which the electrodes carried by the horns 12 and 14 are slightly separated, sufficient separation being afforded to permit adjustment of the work relative thereto. The means connected to link 22 may, as will be understood, be actuated to clamp the work between the just-mentioned electrodes, and may also be actuated to effect a wider separation of the electrodes to further accommodate adjustments in the position of the work.

In accordance with the present invention, the electrode carrying arms, which are usually secured to the horns 12 and 14 at the forward ends thereof, are replaced by the electrode carrying arms 30 and 32 and the associated elements described below. Arms 30 and 32 are conventionally and adjustably secured to horns 14 and 12. Except for their reversal as to position, the arms 30 and 32 and associated elements may be similarly constructed and arranged and, consequently, a description of one will suffice for both.

Referring particularly to Figs. 2 and 3, the arm 30 terminates in a downwardly directed portion 40, which serves as a bearing for a rotatable electrode carrying member 42. The member 42 is provided with an enlarged head 44, which defines a shoulder 46. Shoulder 46 is drawn into snug engagement with the outer face of the portion 40 by means illustrated as comprising the lock nuts 48. Current conduction between the arm 30 and the member 44 may thus take place between the shoulder 46 and the engaged portions of the member 40 and also between the cylindrical surface 50 of the member 44 and the engaged bearing portion of the arm 30. An efficient and satisfactory electrical circuit is thus provided, and at the same time the member 42 may be rotated relative to the arm 30 to bring it to its successive operating positions.

In accordance with the present invention, the head 44 supports a plurality of electrodes 60, only two diametrically opposed such electrodes being shown by way of example. The electrodes 60 may be conventionally constructed, and are illustrated as having tapered bodies which are received in correspondingly tapered openings 62 in the head 44. The electrodes are provided with usual deflector tubes 64, the inner ends whereof are secured to distributor 66 provided at the end of a coolant inlet line 68, which extends through the body of the member 42, and is supported therein by perforate spiders 69. Line 68 may be connected in any suitable way, as by a flexible hose (not shown) to a source of coolant, which flexible connection accommodates the hereinafter mentioned rocking movements of the member 42. Coolant introduced through the line 68 and into the electrodes through the deflector tubes 64 is discharged therefrom through the annular spaces surrounding the deflector tubes 64 and the inlet line 68, as will be understood. A suitable exhaust connection for the last-mentioned annular space 70 is indicated at 72 and may, as will be understood, be flexibly connected to the exhaust side of the coolant circuit.

Since the member 42 supports only two diametrically opposed electrodes in the present embodiment, the system is arranged so that this member may occupy either one of two diametrically opposite positions, and is provided with a motive means operative to reciprocate it between these positions. The just-mentioned motive means is illustrated herein as comprising a usual air motor 80 of the vane type. Motor 80 is provided with a housing which is secured to the horn 14 by supporting brackets 82, and also accommodates a rock shaft 84, to which the operating vane 86 is secured. The end of the rock shaft 84 extends outwardly of the housing and is suitably pinned or otherwise connected to the end of the member 42. The connection between brackets 82 and horn 14 is adjustable to accommodate axial adjusting movements of arm 30 relative to horn 14. Any suitable means may be provided to firmly hold member 42 in its respective limit positions. As described below in connection with Fig. 5, it is now preferred to utilize motor 80 for this purpose and, consequently, the fluid circuits associated with motor 80 are so arranged that air or other operating fluid acts against the motor in each limit position to hold it and member 42 in such limit position. When it is desired to reverse the position of member 42, the just-mentioned fluid circuits are reversed, thereby causing the motor to rock member 42 through an angle of 180° and retain it in the opposite limit position.

It will be recognized that while member 42 is in, for example, the illustrated position, the lower electrode 60 is in operative position for welding purposes and may be moved into clamping engagement with the work by the previously described movement of horn 14. At the same time, the upper electrode 60 is accessible for repair or replacement purposes, which purposes can be accomplished without interfering with the continued operation of the welder.

In spot welding machines, electrodes require very frequent dressing operations, and in the preferred practice of the invention, accordingly, means are provided to enable the inactive electrode of each pair to be dressed while in the inactive or dressing position.

The dressing equipment is illustrated as comprising a usual fly cutter 90, suitably secured at the lower end of a rotatable shaft 92, which is supported in a bearing member 94. The upper end of the shaft is connected, through governor links 96 and 98, to a crosshead 100, which in turn is coupled to the rotatable drive shaft 104 of a usual motor 106, which may be air operated or otherwise. Motor 106 is carried by a bracket 108, which in turn is adjustably secured to an upstanding bracket 110. The latter bracket is secured to the arm 30. With this arrangement, the normal position of the fly cutter 90 may be vertically adjusted by rotating adjusting nut 111 to accommodate differently dimensioned electrodes, as will be understood.

Referring further to the governor elements, the links 98, which may be arranged in pairs, are pinned to the upper end of the shaft 92, and to the companion links 96. Links 96, in turn, are pinned to crosshead 100. A spring or equivalent element 112 is provided to normally bias the links 96 and 98 to the illustrated position, in which the fly cutter 90 is retracted. The links 96 carry weights 114 and it will be understood that during rotation of the shaft 104, these weights overcome the effect of the spring 112 and move the fly cutter 90 downwardly into engagement with the working face of the upper electrode 60. The pressure of this engagement is, of course, determined by the rate of rotation of the motor 106 and by the proportionings of the weights 114 and the spring 112. As described in connection with Fig. 6, means are preferably provided to automatically time the operation of the motor 106 so that in response to each actuation thereof it produces a dressing operation of predetermined length. It will also be understood that the shape of the fly cutter or other dressing instruments may be made to conform to the desired configuration of the working face of the electrode.

In the preferred practice of the invention, a given electrode is subjected to a dressing operation at regular intervals based, for example, upon a predetermined number of welds. When a series comprising such predetermined number of welds has been made, utilizing a particular electrode, the motor 80 is actuated to reverse the position of the member 42, thereby presenting a previously dressed electrode to the work, and presenting the used electrode to the dressing fixture. As soon as such used electrode is so presented to the dressing fixture, the motor 106 is turned on and is caused to remain in operation for a predetermined interval. As will be obvious, and in the broader aspects of the invention, various control systems may be utilized to provide the above-mentioned sequence. An illustrative such system is shown in Fig. 6, in which a usual weld timer 120 is arranged to receive power from a suitable source of supply, illustrated as comprising line conductors L1 and L2. The weld timer 120 is under the control of a usual pilot switch 122 and, as will be understood, may incorporate means which, in response to a momentary closure of switch 122, actuate the horn 14 to clamp the work between the electrodes, cause the flow of a desired quantity of welding current through the work, and thereafter actuate horn 14 to relieve the just-mentioned welding pressure. In the present instance, each such return movement of the horn 14, which takes place at the conclusion of a particular welding operation, is utilized to actuate counting or integrating mechanism. More particularly, the machine frame 10 supports a usual limit switch 130, which may be and preferably is of the snap type. As shown, switch 130 comprises a fixed contact 132 and a movable contact 134, which is carried at the end of a pivoted arm 136. The shaft 138, to which arm 136 is fixed, also carries a walking beam 140, which cooperates with a roller 142, yieldably associated with the end of an operating arm 144. Arm 144 is fixed on a shaft 146 and is coupled to a companion arm 148 through a spring 150. Arm 148 is disposed for engagement by a push rod 152 carried by horn 14. When horn 14 is retracted to the illustrated position at the conclusion of each welding operation, push rod 152 engages arm 148 and rocks it clockwise, as shown in Fig. 5. This clockwise movement is transmitted through spring 150 to arm 144 and causes the roller 142 to advance upwardly along the walking beam 140. After a predetermined amount of such movement, roller 142 passes above the pivotal axis of walking beam 140 and quickly snaps the latter to a position in which contacts 132 and 134 are brought into engagement with each other. Release of the pressure on arm 148 enables spring 154 to restore the parts to a position in which the contacts 132 and 134 are separated. The spring 150 accommodates any additional movement of arm 148 after the just-mentioned closing movement of the movable contact 134. Such additional movement is relatively slight when horn 14 is moved to the position shown in Fig. 1, and is somewhat greater when horn 14 is actuated to afford maximum separation of the electrodes.

The counting mechanism which responds to switch 130 may be variously arranged, but is illustrated as comprising a usual ratchet unit having a toothed drum 160, an advancing pawl 162 and a resetting pawl 164. Pawls 162 and 164 are provided with operating solenoids 166 and 168, respectively, and are also provided with biasing springs 170 and 172. It will be understood that spring 172 normally holds pawl 162 in the illustrated retracted position and spring 172 holds pawl 164 in holding position. A usual spiral spring 174 biases the drum 160 to the illustrated starting position. The shaft 176 of the ratchet unit carries a commutator arm 178, which cooperates with a plurality of fixed terminals 180, corresponding in number and spacing to the number of teeth on the ratchet unit. Each notching unit of drum 160 thus advances arm 178 by an amount equal to the spacing between successive contacts 180. It will be understood that with the illustrated arrangement, in which drum 160 is advanced one notch at the conclusion of each weld, the number of ratchet teeth and contacts 180 are arranged to be in excess of the number of welds which can successfully be made between successive dressing operations. For example, in connection with the welding of aluminum for aircraft purposes, it is frequently desirable to effect the dressing operation after thirty or forty welds have been made.

As shown, the commutator arm 178 is permanently connected by conductor 181 to the operating coil of a suitable control relay CR3. A conductor 182, which may selectively be connected to any of the terminals 180, serves to complete the circuit for the coil of relay CR3 when the appropriate terminal is reached by arm 178.

Each time relay CR3 is energized, it serves, as described below, to reset the ratchet unit 160. Such actuation of relay CR3 also serves, through a cooperating relay CR4, to actuate a usual four-way valve 184, associated with and common to the electrode motors 80, and a usual electromagnetically operated valve 186, associated with and common to the dresser motors 106. Relay CR4 may be conventionally constructed. As shown, it comprises a spring-biased armature 190, which carries a spring-pressed finger 192 for cooperation with a toothed wheel 194. Wheel 194 is provided with a holding spring 196, which yieldably holds it in the successive positions to which it is advanced by the finger 192. It will be appreciated that a momentary energization of the coil of relay CR4 causes the armature 190 to move counterclockwise. This movement, through finger 192, advances the wheel 194 one notch. When the relay coil is de-energized, spring 198 restores the armature to the illustrated position, during which movement the spring associated with finger 192 enables it to pass over the next successive tooth and snap into position therebehind.

The shaft of wheel 194 carries a pair of triangular operating discs 200 and 202. In the illustrated position, disc 200 maintains contacts 204 and 206 separated from each other and disc 202 maintains contacts 208 and 210 in engagement with each other. If the unit is advanced to the next position, discs 200 and 202 are advanced through a 60° angle and present the flat sides thereof to the spring arms 212 and 214. Under these conditions, arm 212 is enabled to move contact 206 into engagement with contact 204. Under these circumstances, also, arm 214 is enabled to separate contacts 208 and 210 and thereafter to bring contact 208 into engagement with contact 216.

It is believed that the remaining details of the system may best be understood by a description of the operation thereof. Under normal conditions, the line switches LS1 and LS2 are open, so that all of the indicated electrical elements of the system are in a de-energized condition. Under these conditions, also, the pressure fluid circuits may be regarded as de-energized, in which event the motors 80 hold their associated pairs of electrodes in the positions to which they were last moved under the influence of the friction between the corresponding members 42 and their bearings. Under these conditions, also, the limit switch 130 may be regarded as occupying a position in which its contacts 132 and 134 are in engagement with each other, since the upper horn 14 normally occupies the indicated separated position. Further, the ratchet unit 160 may be regarded as being in its normal or starting position. To condition the system for operation, the line 224 associated with motors 80 may be connected to its source and the line switches LS1 and LS2 may be closed. The former action supplies pressure fluid to the motors 80, positively holding them in the positions to which they were last moved and correspondingly positively retaining the associated pairs of electrodes in the respective dressing and operating positions. Closure of the line switches LS1 and LS2 completes a circuit for the coil of relay CR5, through the now engaged contacts 208 and 210 of relay CR4. Thus energized, relay CR5 closes its sole contacts CR5a, which action is without effect in view of the now open condition of contact CR7a.

In order to make a weld, it will be understood, as aforesaid, that the starting switch 122 may be momentarily closed, which action energizes the usual weld timer 120. Upon being so energized, the weld timer 120 actuates the operating means (not shown) associated with the link 22 and causes the horn 14 to move the active pair of electrodes 60 into engagement with the work. The timer 120, also, through conventional means (not shown), energizes the welding transformer WT (Fig. 6) and causes the flow of welding current through the work. At the expiration of the period for which the timer 120 is set, it de-energizes the welding transformer WT and also de-energizes the operating means associated with link 22, thereby causing the electrodes to be separated from the work.

The making of the initial weld of each series of welds completes auxiliary control circuits associated with the ratchet unit 160 as follows: The flow of current through the welding transformer energizes a control relay CR1, the coil whereof is connected across the secondary winding of the welding transformer. Upon being so energized, relay CR1 closes its sole contact CR1a and completes a circuit for an associated control relay CR2. Upon being so energized, relay CR2 closes its contacts CR2a and CR2b. Contact CR2a completes a self-holding circuit for relay CR2 and, consequently, this relay remains energized even after the de-energization of relay CR1, which occurs at the conclusion of the first weld.

Closure of contact CR2b prepares a circuit for the winding 166 of the advancing pawl 162, which circuit is interrupted, under the conditions stated, however, since the movement of horn 14 at the beginning of the initial weld opens the limit switch 130.

At the conclusion of the above-mentioned first weld, the return movement of horn 14 causes closure of limit switch 130, which action completes an obvious circuit for the winding 166, which circuit includes the now closed contacts CR2b and CR3b. Upon completion of this circuit, pawl 162 is advanced and moves the drum 160 from its starting position to the next position. This action is without effect on relay CR3, since the lead 182 is in engagement with a terminal which will not be reached until after a number of welds have been made. The initial movement of the drum 160, however, does enable closure of the limit switch 218, associated therewith, which action is preparatory to completion of a circuit for the reset winding 168.

The second weld may be effected, as described before, by a momentary closure of switch 122, the consequent re-energization and de-energization of relay CR1 being without effect, since relay CR2 is energized through the above holding circuit. The clockwise movement of horn 14, which takes place at the beginning of the second weld, enables limit switch 130 to reopen, thereby de-energizing winding 166 and enabling pawl 162 to move to its retracted position behind the next ratchet tooth. The counterclockwise movement of horn 14 at the conclusion of the second weld again closes limit switch 130 and causes the drum 160 to advance to its second operating position. Similar operations occur as a consequence of the third and succeeding welds, it being noted that at the conclusion of each weld, completion of the return movement of horn 14 causes the ratchet unit to advance one step.

The completion of the last weld in the series for which the dressing mechanism is set, moves the commutator arm 178 into engagement with the terminal to which the lead 182 is connected. This action immediately completes a circuit for the winding of relay CR3, which thereupon moves to the energized position, closing its contacts CR3c, CR3d and CR3e, and opening its contacts CR3a and CR3b. The opening of contact CR3a prevents energization of the weld timer 120, and consequently prevents a false operation of the welding machine during the time that the electrode assemblies are being reversed in position. In addition, the opening of contact CR3a opens the holding circuit for, and de-energizes, relay CR2, contacts CR2a and CR2b whereof, consequently, open.

The opening of contact CR3b interrupts the otherwise complete circuit for the advancing winding 166, which action is preparatory to the resetting of the drum 160.

Closure of contact CR3c completes a circuit, through the now closed limit switch 218, for the winding 168 of the resetting pawl, which pawl is thereupon withdrawn from holding engagement with the drum and enables the return spring 174 to restore the drum 160 to the starting position. The return movement of the drum interrupts the circuit for the coil of relay CR3, enabling the energy stored in the coil thereof to start discharging through an associated timing condenser c1. Through this timing circuit, relay CR3 is retained in the energized position, sufficiently long to enable completion of the reversing movement of the electrode assemblies, described below. Completion of the return movement of the drum 160 opens the limit switch 218 associated therewith, thereby interrupting the circuit for the resetting winding 168, which action is without effect.

Closure of contact CR3e completes a circuit for control relay CR6, which thereupon closes its sole contact CR6a. Closure of the latter contact completes a circuit for control relay CR7, which thereupon closes its contacts CR7a and CR7b. The latter contact completes a self-holding circuit for relay CR7, which, consequently, remains in the energized condition so long as the line switches LS1 and LS2 remain closed. Closure of contact CR7a prepares a circuit for the timer 200, associated with valve 186, which valve is common to the dresser motors 106. Timer 200 may be of any conventional type, which, on being energized, closes its contact 200a, retains it closed for a definite time, and then reopens it. Completion of the circuit for timer 200 is prevented by the contact CR5a, which, as mentioned below, is now open.

Closure of contact CR3d of relay CR3 completes a circuit for the winding of relay CR4, which thereupon, as aforesaid, rotates the discs 200 and 202 through angles of 60°. The movement of disc 200 causes closure of contacts 204 and 206, which action energizes winding 220, associated with valve 184. This operation reverses the position of this valve and, consequently, causes motors 80 to move to and be retained at the opposite positions thereof, in which the previously active pair of electrodes 60 are presented to the associated dressing tools, and in which the previously inactive electrodes 60 are held in the working positions thereof.

The movement of disc 202 of relay CR4 causes separation of contacts 208 and 210, and shortly thereafter, causes closure of contacts 208 and 216. The separation of contacts 208 and 210 interrupts the initially complete energizing circuit for the coil of relay CR5, enabling this relay to promptly open its contact CR5a. The timing of the circuits is such that this reopening precedes the closure of contact CR7a. This latter timing sequence may be insured by providing relay CR7 with an adjustable dashpot 202, which delays its closure long enough to allow for the reopening of relay CR5.

The closure of contacts 208 and 216 of relay CR4, which immediately follows the disengagement of contact 210, recompletes the circuit for the coil of relay CR5. Reclosure of contact CR5a is, however, delayed, as by an adjustable dashpot 204, for an interval sufficiently long to allow for the complete reversing movement of motors 80. Shortly after motors 80 complete their reversing movement, contact CR5a recloses and thereupon completes the circuit for the timer 200. In response to this action, timer contact 200a closes and energizes valve 186, associated with dresser motors 106. Upon completion of this circuit, motors 106 are energized to place their associated fly cutters in rotation. In addition, the associated governors cause these fly cutters to move to and yieldingly engage the faces of the electrodes presented thereto, and effect dressing operations thereon.

Relay CR3 may be adjusted to time out and resume its de-energized position at any time after motors 80 complete their reversing operation. As soon as this timing out operation is complete, relay CR3 resumes the illustrated position, reclosing contacts CR3a and CR3b and reopening contacts CR3c, CR3d and CR3e. Reclosure of contact CR3a reconditions the weld timer 120 for energization in response to a reclosure of the starting switch 122 and, consequently, enables the initiation of the first weld of the next series, being the first weld with the newly dressed electrodes. Closure of contact CR3a also conditions the holding circuit for relay CR2 for recompletion as soon as such relay is re-energized during the course of such next weld. Closure of contact CR3b is without effect since contact CR2b is now open. Reopening of contact CR3c is without effect, since the limit switch 218 is now open. Opening of contact CR3d serves to de-energize relay CR4, which action restores its armature 190 to the illustrated position, but does not alter the position of the contacts of this relay. Reopening of contact CR3e de-energizes relay CR6, but is otherwise without effect, in view of the holding circuit afforded for relay CR7 by its contact CR7b.

Independently of whether a succeeding weld is initiated during the operation of the dresser motors, as influenced by timer 200, or whether the machine remains idle during such dressing motor operation, the dressing operation continues until timer 200 times out. This timing out interrupts, at contact 200a, the circuit for, and de-energizes, valve 186. This action stops the dressing motors 106 and allows the dressing tools 93 to be retracted away from the electrodes.

A succeeding weld may be initiated, either during or after the completion of the dressing operation, by again closing switch 122. The resultant sequencing, and the sequencing which occurs during the making of additional welds in the second series, duplicates that described with reference to the first series of welds. At the conclusion of the second series of welds, relay CR3 is again energized with, except as noted below, the same effect as before. In this instance, the operation of relay CR4 opens contacts 204 and 206, de-energizing the reversing valve 184 and restoring the connections for the electrode motors 80 to the original condition. In response to this action, the motors 80 again reverse the electrode assemblies, presenting the previously dressed pair of electrodes to the work engaging position, and presenting the used pair of electrodes to the dressing assemblies. In this case, also, the transfer movement of relay CR4 first separates contact 208 from contact 216 and thereafter causes this contact to engage contact 210. As before, this momentary interruption of the circuit of relay CR5 causes it to resume the de-energized position and to thereafter, at the expiration of its timing period, assume the energized position. The opening of contact CR5a de-energizes timer 200 and resets the same. The subsequent reclosure of contact CR5a again energizes the timer 200 and initiates a new timing period thereof, throughout which it maintains the dresser motors in operation.

The exception noted above with respect to relay CR3 has to do with control relays CR6 and CR7. In this case, closure of contact CR3e again energizes relay CR6, but this action is without effect since in this case relay CR7 is already energized. The sequencing afforded by relays CR6 and CR7 is needed only in connection with the making of the first series of welds after placing the system in service. Except for contact CR7a, it will be noted, the timer 200 and, consequently, dresser motor valve 186, would be energized as an immediate consequence of the closure of the line switches LS1 and LS2.

The timing out of relay CR3 and of timer 200, following completion of the second series, duplicates the corresponding operations which follow completion of the first series. All operations incident to the third and succeeding series of welds duplicate those described in connection with the second series, except that, in connection with alternate series, valve 224 is de-energized, and, in connection with intervening series, it is energized.

It will be noticed that if the system is taken out of service at an intermediate stage of a series of welds, ratchet unit 160 remains in the corresponding intermediate position and, consequently, as soon as such series is completed, following the replacing of the system in service, the reversal in position of the electrodes takes place in proper manner. The removal from service of the system de-energizes all control circuits, including the circuit for relay CR7 and, consequently, when relay CR3 is first energized after the system is again placed in service, relays CR6 and CR7 are again sequenced in the manner described in connection with completion of the first series of welds.

As will be recognized, the previously mentioned conventional timers 120 and 200 are commercially available devices and, it is not believed, consequently, that the details of construction thereof need be described in the present application. By way of example, timer 120 may be arranged as shown in U. S. Patent No. 2,289,320, granted July 7, 1942, and timer 200 may be arranged as shown in U. S. Patent No. 2,171,348, granted August 29, 1939.

Although only a single specific embodiment of the invention has been described in detail, it will be appreciated that various modifications in the form, number and arrangement of the parts may be made without departing from the spirit and scope of the invention.

What is claimed is:

1. In a welder, an electrode supporting member having means adapting it to support a plurality of electrodes, said member being movable between a plurality of positions, each movement of said member from one said position to another being effective to move one electrode to a working position in which it can be engaged with work to be welded and to move another said electrode to a dressing position, and means carried by the welder at said dressing position for effecting a dressing operation on said another electrode said means including means engageable with an electrode at said dressing position.

2. In a welder, an electrode supporting member having means adapting it to support an electrode, said member being movable between a plurality of positions, said member being effective in one said position to hold said electrode in position for engagement with work to be welded and, in another said position, to hold said electrode in position to have a dressing operation performed thereon, a dressing tool engageable with said electrode only when the electrode is in dressing position, means for actuating said dressing tool, and timing means controlled by and in accordance with the operation of the welder for controlling said actuating means.

3. In a welder, an electrode supporting member having means adapting it to support an electrode, said member being movable between a plurality of positions, said member being effective in one said position to hold said electrode in position for engagement with work to be welded and, in another said position, to hold said electrode in position to have a dressing operation performed thereon, a dressing tool engageable with said electrode when the latter is in said dressing position, motive means for effecting said movement of said member and actuating means for said dressing tool, and timing means controlled by and in accordance with the operation of said welder for sequentially actuating said motive means and actuating means to cause said electrode to be moved to said dressing position and to thereafter actuate said dressing tool.

4. In a welder, an electrode supporting member having means adapting it to support an electrode, said member being movable between a plurality of positions, said member being effective in one said position to hold said electrode in position for engagement with work to be welded and, in another said position, to hold said electrode in position to have a dressing operation performed thereon, motive means for moving said member between said positions, means for enabling the delivery of welding current to said electrode, and means operative while said motive means is moving said member for rendering said enabling means ineffective.

5. In a welder, a pair of electrodes relatively movable with respect to each other to a welding position in which they engage the work to be welded, a member for supporting one of said electrodes and on which it is movable between a working position in readiness for a said relative movement to the welding position and a dressing position in which a said relative movement is ineffective to cause the electrodes to so engage the work, and means operative only when said one electrode is in the dressing position to effect a dressing operation thereon.

CHARLES BRUNO.

REFERENCES CITED

The following references are of record in the file of this patent:

UNITED STATES PATENTS

| Number | Name | Date |
|---|---|---|
| 647,694 | Burton | Apr. 7, 1900 |
| 1,282,502 | Wagner et al. | Oct. 22, 1918 |
| 1,635,582 | Meadowcroft | July 12, 1927 |
| 1,635,583 | Meadowcroft | July 12, 1927 |
| 2,009,647 | Bruse et al. | July 30, 1935 |
| 2,130,657 | Watkin | Sept. 20, 1938 |
| 1,810,225 | Pugh | June 16, 1931 |
| 2,357,038 | Whitesell | Aug. 29, 1944 |

FOREIGN PATENTS

| Number | Country | Date |
|---|---|---|
| 426,319 | British | June 27, 1933 |
| 525,053 | British | Aug. 21, 1940 |
| 832,846 | French | July 11, 1938 |
| 277,655 | Italian | Sept. 16, 1930 |